G. H. DAY.
EYE PROTECTOR.
APPLICATION FILED DEC. 28, 1914.
1,190,123.
Patented July 4, 1916.
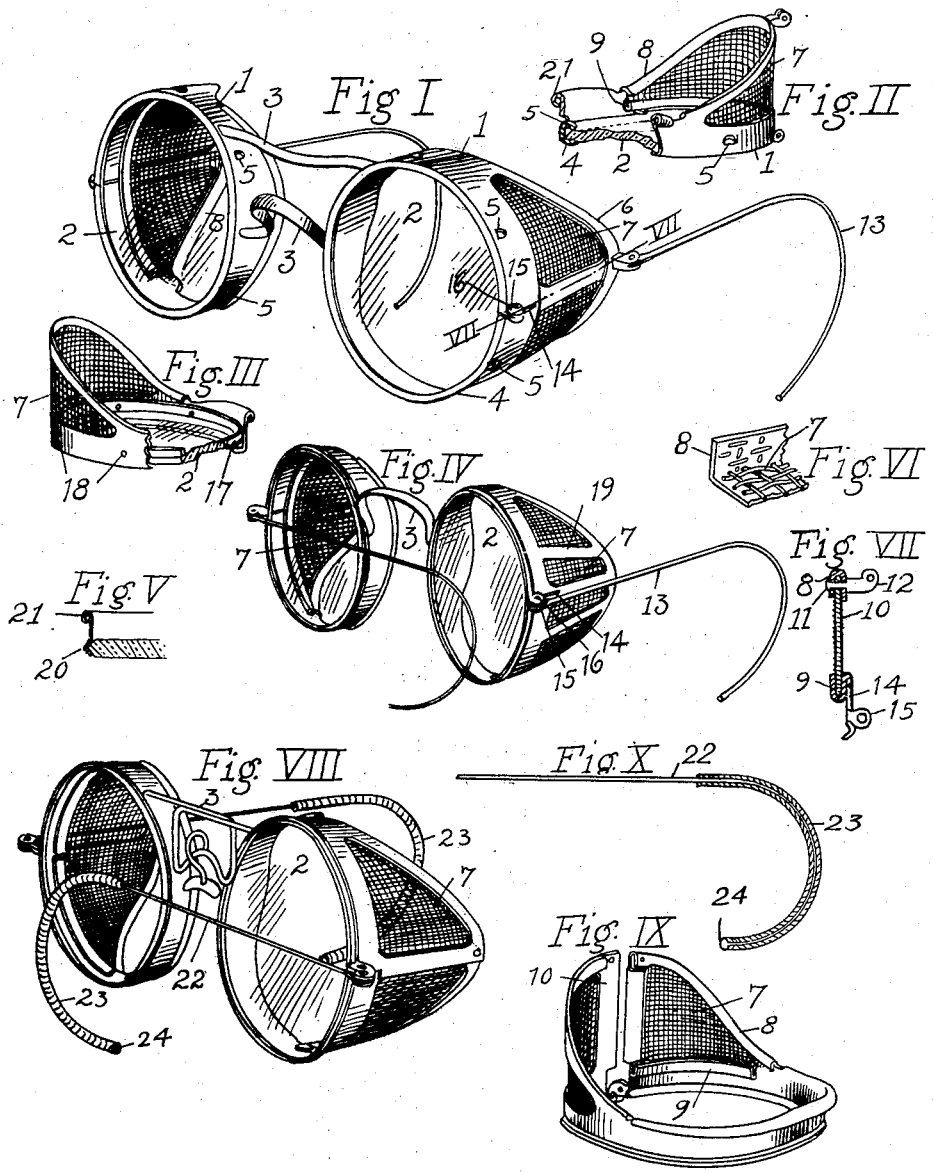
WITNESSES:
INVENTOR
GEORGE H. DAY
BY
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION.

EYE-PROTECTOR.

1,190,123. Specification of Letters Patent. Patented July 4, 1916.

Application filed December 28, 1914. Serial No. 879,303.

*To all whom it may concern:*

Be it known that I, GEORGE H. DAY, a citizen of the United States, residing at Southbridge, in the county of Worcester and State of Massachusetts, have invented certain new and useful Improvements in Eye-Protectors, of which the following is a specification.

This invention relates to improvements in eye protectors, and has particular reference to what may properly be termed a one-piece construction.

The leading object of this invention is the provision of an extremely durable and substantial eye protector which will possess a maximum of rigidity and strength compatible with the desired lightness of weight and comfort.

A further object of the invention is the provision of a goggle of this nature in which soldering and other expensive operations are dispensed with to a maximum degree, whereby the expense of production of the goggle may be reduced.

Another object of the invention is the provision of an improved manner of securing the screen portion of the eye and face shield in position to insure secure retention thereof, and prevent strain.

Among other objects of the invention are the provision of improved means for retaining the lenses in position, of improved and strengthened joints for uniting the parts, and for finishing the edges, and in general a simplification and improvement of structure of devices of this nature, and it will be understood that any modification of the specific details of construction shown and described within the scope of the appended claims may be made without in anywise departing from or exceeding the spirit of this invention.

Figure I represents a perspective view illustrating one form of the construction. Fig. II represents a fragmentary view, parts being broken away and shown in section to illustrate the details of construction of the frame. Fig. III is a view similar to Fig. II, illustrating an alternative method of construction. Fig. IV represents a view in which the entire construction is made in one piece. Fig. V is a fragmentary sectional view through a portion of the lens frame of the structure illustrated in Fig. IV. Fig. VI is a detail perspective view illustrating the manner in which the mesh is secured between the inturned flange of the frame. Fig. VII represents a sectional view on the line VII—VII of Fig. I. Fig. VIII represents a perspective view of a frame in which the joint is disposed at the outer side. Fig. IX represents a detail view of one of the lens frames in partially assembled condition. Fig. X represents a sectional view of the temple illustrated in Fig. VIII, and Fig. XI represents a perspective view illustrating a construction similar to Fig. VII, but particularly adapted for a separate or folding shield member.

In the drawings, in which similar characters of reference are employed to denote corresponding parts throughout the several views, the numeral 1 designates the main ring or frame for the lens 2, the two frames being connected by any suitable bridge connection 3, different styles of bridge connection being illustrated in different views.

In that form of this invention particularly illustrated in Figs. I and II, each of the frames 1 comprises the main ring portion having an inturned flange 4 at one side thereof, and having a plurality of lips or ears punched inwardly therefrom adjacent the flange 4, said lips or ears 5 being so spaced from the flange 4 as to provide a groove or channel between the lip and flange of thickness to receive a lens, as will be best understood by reference to Fig. II. On the opposite side the portion 1 has projecting therefrom at the outer side the substantially triangular shield portion 6, said shield being cut to provide merely a frame in which is mounted the screen 7. To retain the screening 7 in position the portion 6 has preferably the inturned flange 8 pinched down upon the edge of the screen and planished to provide a smooth surface, the pinching and planishing action causing the wires of the screen or mesh 7 to bite into and become embedded in the inner surfaces of the frame 6 and flange 8 and securely retained, as is clearly indicated in Fig. VI.

To retain the forward or, as in Fig. II, the lower portion of the screen, the body 1 has the portion thereof which is cut away to provide the screen receiving aperture bent inwardly and there formed into a trough or U-shaped portion 9, into which the said portion of the screen or mesh fits and in which it is secured in the same manner as between the frame 6 and flange 8. These parts are preferably so secured before the forming or closure of the ring 1 when the parts are in substantially straight condition and the operation of closing the flange 8 and the U-shaped trough 9 being preferably simultaneously performed.

It will be at once apparent that the provision of these doubled over portions of the material serves not only to securely and satisfactorily retain the screen or mesh 7 in position without the necessity for the employment of solder or the like, but at the same time present a very stiff non-yielding construction. To further increase the stiffness of the frame there is preferably inserted, as at the widest point of the shield 6, a brace 10 having its ends fitting into the trough 9 and between the frame 6 and flange 8 with the screen, if desired, the parts being simply secured together by the pinching or closing of the trough to retain the mesh, as previously referred to. If preferred, however, rivets may also be passed through the parts to secure the same in position, in this connection a very desirable construction being to form a rivet 11 on the end piece 12, the rivet thus serving both to secure the brace 10 in position and also to secure the end piece 12 at the rear portion of the frame 6, a temple or other head engaging member 13 for retaining the protector in position being suitably attached to said end piece.

It is to be noted that to facilitate the insertion or removal of the lens 2 from the frame, the frame is preferably provided with the small slot 14, ears 15 being suitably secured to the portion 1 or cut therefrom and turned outwardly, a screw or similar connection 16 passing through the ears and normally serving to hold the same together with the slot in closed position and securely retain the lens, it being understood that loosening of the screw 16 permits of sufficient springing open of the ring or frame 1 to permit of removal of the lens.

While in Fig. II the use of the tongue 5 for retaining the lens has been shown in connection with the use of the trough 9, for aiding in retaining the screen, if desired both of these parts may be replaced by the ring indicated in Fig. III, said ring 17 being suitably secured either by rivets or screws 18, in such position as to securely retain the lens in position and at the same time to clampingly engage and secure the adjacent portion of the mesh 7. In addition this ring forms an efficient and desirable stiffening member to increase the rigidity and strength of the portion 1.

In that form of construction illustrated in Figs. IV and V, the entire mounting with the exception of the temples or retaining members 13, is formed from a single stamping of sheet metal. In this form the bridge is of one piece with the lens frame 1, the frames themselves being constructed substantially as indicated in Fig. II for example, with the exception that in place of having the separate brace 10 there described, there are provided a plurality of braces 19 forming integral connections extending between the lens frame 1 and intermediate portion of the shield frame 6 to impart desired rigidity and resistance to distortion of the shield frame 6. In this form of construction the ears 15 are integrally formed from the material adjacent the slot 14 and bent into correct position, these ears serving both to hold the slot 14 in closed position to securely retain the lens, and also serving as bearings between which the temple 13 is pivotally mounted on the screw 16. A possible variation in the frame construction of Fig. IV has been indicated in Fig. V, in which in place of making use of the tongues 5 for retaining the lens in position the forward edge of the frame is rolled or bent into the V-shaped groove 20, the opposite edge as in the other forms hitherto described being curved into the roll 21, which will have a satisfactorily soft or comfortable engagement with the face and will prevent any sharp corners tending to irritate the same.

In Figs. VIII and IX are illustrated another embodiment of this one-piece construction, in which the joint of the frame 1 is located centrally of the shield member, each of the ends of the frame member being provided with one of the brace portions 10, which portions may be reversely bent as indicated at the right to securely clamp the adjacent section of the mesh 7, or the mesh 7 may be continuous across the joint and simply clamped by the portions 8 and 9, as preferred. A rivet or rivets are preferably employed to retain the braces 10 in overlapped relation, as illustrated, an ordinary end piece being secured to the front or outer edge of the frame 1 and serving to unite the two ends thereof at this point, loosening of the securing screw of the end piece facilitating insertion and removal of the lens 2.

In Fig. X an inexpensive construction of temple for use on this goggle has been illustrated, this temple comprising the core or main section 22 having suitably mounted thereon the larger spirally wound portion 23 prevented from disengagement with the body of the temple by the ball 24 formed at the end of the ear hook.

In Fig. XI, I have illustrated a construction quite similar to that of Fig. VII, that is, both embody the portions 6 and 8 turned to form a trough for the outer edge of the frame of the shield in connection with a second trough member 9, which, however, in place of being integral with the lens frame 1 is separate therefrom and adapted to be pivoted thereto at the point 25. In this construction a separate brace 10 is employed adapted to be secured in position in the same manner as indicated in Fig. VII. It will thus be seen that this construction is in all essential respects the same as that shown in Figs. II and VII, except that it is employed for a separate shield in place of for a shield which is unitary with the lens frame.

From the foregoing description taken in connection with the accompanying drawings, the construction of this improved goggle should be readily apparent, and it will be seen that there has been provided a goggle composed of extremely few parts, all of which parts are so constructed as to possess maximum rigidity and to offer the greatest possible resistance to any strain tending to bend or distort the parts either when in position on the face or when laid on the bench or in like position. It will further be noted that by this improved construction it is possible to satisfactorily secure the screen or mesh in position without the use of solder and at the same time the securing means for said mesh serves as reinforcement or braces for the normally weak screen shield member.

Particular attention is also invited to the presence of the transverse braces 10 or 19 imparting additional rigidity to the normally weak screen member and preventing accidental collapsing thereof.

I claim:

1. A frame member for an eye protector, comprising a ring having an inturned flange at one side thereof, for engagement with a lens and having an integral shield member projecting from the opposite side thereof, said shield member being provided with an inturned flange, and a mesh for the shield member fitting beneath the flange and secured in position by pinching of the flange thereagainst, substantially as described.

2. A frame for an eye protector, comprising a ring having a portion at one edge thereof for engaging a lens, means projecting inwardly of the frame for engaging the opposite face of the lens to secure the same in position, said frame having a portion of the opposite edge thereof rolled to provide a face engaging bead and having the remainder of said edge curving rearwardly to provide a shield portion, the central part of the shield portion being cut away, and the portion of the frame at each side of the cut away part being doubled to provide a trough, and a screen or mesh having its edges fitting within the said trough, the material of the trough being pinched down upon the edges of the mesh to securely retain the same in position.

3. In an eye protector, a shield comprising an open frame in which a mesh is received, and overlapping brace members connecting portions of said frame to prevent crushing thereof.

4. In a device of the character described, a shield including a plurality of frames, and members connecting portions of each frame, said members being adapted to engage with each other when the frames are assembled to provide a rigid shield.

5. In an eye protector, the combination with split lens frames, of shields carried by said frames comprising frame portions in which a shield element is mounted, and braces connecting portions of said shield frames to resist crushing of the shield when the lens frames are mounted upon the lenses.

6. In an eye protector, the combination with a slit lens frame for clamping engagement with a lens, of shield elements carried by said frame comprising substantially triangularly-shaped frame portions having a mesh secured therein, said shield elements being located adjacent the terminal ends of said lens frame, a flange connection between the shield elements whereby the elements are united to form a complete shield and whereby said shield is reinforced to prevent crushing thereof, and means to positively secure said shield elements against accidental disengagement one from the other.

In testimony whereof I affix my signature in presence of two witnesses.

GEORGE H. DAY.

Witnesses:
H. K. PARSONS,
E. M. HALVORSEN.